(12) United States Patent
Kaufman

(10) Patent No.: US 7,700,893 B2
(45) Date of Patent: Apr. 20, 2010

(54) SYSTEM AND METHOD FOR CALIBRATING WIRE FEEDER MOTOR CONTROL

(75) Inventor: Charles L. Kaufman, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1185 days.

(21) Appl. No.: 11/020,584

(22) Filed: Dec. 22, 2004

(65) Prior Publication Data

US 2006/0131293 A1     Jun. 22, 2006

(51) Int. Cl.
   *B23K 9/133* (2006.01)
(52) U.S. Cl. .................................. 219/137.71
(58) Field of Classification Search ............ 219/137.71, 219/130.21, 137 PS
   See application file for complete search history.

(56) References Cited

U.S. PATENT DOCUMENTS

| | | | | |
|---|---|---|---|---|
| 3,851,137 | A | * | 11/1974 | Verhagen et al. ....... 219/130.21 |
| 4,247,751 | A | * | 1/1981 | Ashton et al. .......... 219/130.31 |
| 4,301,355 | A | * | 11/1981 | Kimbrough et al. .... 219/137.71 |
| 4,477,713 | A | * | 10/1984 | Cook et al. ............ 219/124.34 |
| 4,584,458 | A | * | 4/1986 | Tremblay et al. ....... 219/137.71 |
| 4,608,482 | A | * | 8/1986 | Cox et al. ............. 219/137.71 |
| 5,676,857 | A | * | 10/1997 | Parker ........................ 219/61 |
| 6,531,684 | B2 | * | 3/2003 | Rice et al. ............. 219/130.21 |
| 2002/0190043 | A1 | * | 12/2002 | Rice et al. ............. 219/130.31 |
| 2003/0052108 | A1 | * | 3/2003 | Rappl et al. ............. 219/130.5 |
| 2006/0070986 | A1 | * | 4/2006 | Ihde et al. ............. 219/137.71 |

\* cited by examiner

*Primary Examiner*—Stephen J Ralis
(74) *Attorney, Agent, or Firm*—Fletcher Yoder

(57) ABSTRACT

The present invention is directed to an apparatus and method for controlling a wire feeder. The wire feeder includes a wire feeder motor configured to drive delivery of a welding wire at an actual wire feed speed (WFS) according to a welding-type process. The wire feeder also includes a processor configured to adjust motor calibration parameters such that actual WFS matches a desired WFS.

17 Claims, 4 Drawing Sheets

SYSTEM AND METHOD FOR CALIBRATING WIRE FEEDER MOTOR CONTROL

BACKGROUND OF THE INVENTION

The present invention relates generally to welding-type systems and, more particularly, to a system and method for calibrating wire feeder motors for improved starting and consumable delivery.

Performance demands on wire feeders and torches not only require accurate speed but also starting, acceleration, deceleration, and brake/braking control. That is, the consumable wire must be accurately controlled when starting a welding process and accurately disengaged upon termination of the welding-type process. Failure to accurately control startup and delivery of the consumable wire can result in excessive spatter, build-up on the tip of the wire, and generally less accurate welding.

Typical wire feeders have a driven roller assembly for driving a consumable metal wire from a feed spindle through a welding gun for introduction to a weld. The drive mechanism in these driven roller assemblies typically includes a motor or combination of motors. Operation of the motor or motors is typically directed by a motor control system including a controller or processor. In particular, the wire feed control system typically includes a fast acting back electromotive force (EMF) control loop and a slower tachometer feedback control loop. The controller uses feedback from the feedback loops to control the motor or motors based on a stored set of general calibration parameters of the motor.

Each feedback loop is designed to provide feedback regarding a particular phase of the welding-type process. That is, the back EMF control loop is generally designed to respond to instantaneous load changes and the tachometer feedback loop generally provides feedback regarding average wire feed speed. As such, the back EMF control loop is utilized during periods requiring fast responses to changing conditions while the tachometer feedback loop is designed to be utilized during stabilized conditions.

For example, during startup of the wire feeder motor, the controller utilizes feedback from the faster back EMF control loop to control the wire feeder motor. This is often preferred because a sufficient amount of data is typically not accumulated during the start-up phase of a welding-type process to allow the tachometer feedback control loop to be accurately interpreted. On the other hand, following the startup phase, the controller switches to using feedback from the tachometer feedback control loop.

However, the specific characteristic and tolerances of motors may vary and result in variations in startup and delivery wire feed speeds (WFS). Specifically, the generalized motor calibration parameters used to control a given motor may not sufficiently match the particular characteristics and tolerances of that motor. For example, generalized motor calibration parameters may be normalized for an entire line of wire feeder motors and not account for the operation of a particular wire feeder motor, such as a replacement motor. As such, generalized motor calibration parameters fail to precisely account for the idiosyncratic efficiencies or variations that nay be present across a line of line feeder motors. As a result, inconsistencies are possible when arc starting. These inaccurate starts can lead to degraded welding processes and result in failed starts, excessive spatter, build-up on the tip of the wire, and generally less accurate welding.

Accordingly, it would be desirable to have a system and method for calibrating wire feeder motor operation. Specifically, it would be desirable to have a system and method to automatically calibrate control of a wire feed motor that considers the particulars of the wire feeder motor to enhance arc starting performance and consistency.

BRIEF DESCRIPTION OF THE INVENTION

The present invention is directed to a system and method for controlling a wire feeder that overcomes the aforementioned drawbacks. The present invention includes a technique and associated system for calibrating control of a given wire feeder motor to enhance arc starting performance and consistency. The technique allows control of a particular wire feeder to be tailored to the unique wire feeder.

Therefore, in accordance with one aspect of the present invention, a wire feeder is disclosed that includes a wire feeder motor configured to drive delivery of a welding wire at an actual wire feed speed (WFS) according to a welding-type process. The wire feeder also includes a processor configured to adjust motor calibration parameters such that actual WFS matches a desired WFS.

In accordance with another aspect of the present invention, a method of calibrating a wire feeder is disclosed that includes entering a calibration mode for a wire feeder motor, setting a desired WFS, and measuring an actual WFS. The method also includes comparing the actual WFS to the desired WFS and if the actual WFS varies from the desired WFS, modifying a calibration profile until the actual WFS is within a desirable tolerance of the desired WFS. The method further includes storing a modified calibration profile.

In accordance with yet another aspect of the present invention, a wire feeder calibration system includes a processor. The processor is configured to operate according to a control mode to control a wire feeder motor during startup, a feedback mode to determine an accuracy of wire feeder control after startup, and a calibration mode to adjust a motor control profile to increase control accuracy when in the control mode.

According to yet another aspect of the present invention, a wire feeder is disclosed that includes means for receiving a desired operational speed and means for controlling a wire feeder motor based on a calibration profile of the wire feeder motor. The wire feeder also includes means for determining an actual operational speed of the wire feeder motor, means for comparing the actual operational speed to the desired operational speed, and means for adjusting the calibration profile of the wire feeder motor if the actual operational speed substantially deviates from the desired operational speed to calibrate the means for controlling the wire feeder motor.

In accordance with another aspect of the present invention, a wire feeder is disclosed that includes a wire feeder motor configured to drive delivery of a welding wire at an actual WFS according to a welding-type process. The wire feeder also includes a processor configured to monitor wire feeder motor operations during a first welding-type process and adjust a motor calibration profile during the first welding-type process such that wire feeder motor operations in a subsequent welding-type process matches a desired wire feeder motor operation profile.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention is directed to a system and method for calibrating control of a wire feeder system. Specifically, the present invention includes a technique for performing motor-specific control for improved accuracy and control during startup and performance of a welding-type process.

The present invention will be described with respect to a wire feeder for use with welding systems such as Metal Inert Gas (MIG), formerly Gas Metal Arc Welding (GMAW), welding and flux cored welding systems. While the present invention will be described with respect to wire feeders, the present invention is equivalently applicable to a wide variety of welding-type process and welding-type consumable delivery systems and may be utilized with respect to various aspects of welding-type devices. As one skilled in the art will fully appreciate, the hereinafter description of welding devices not only includes welders but also includes any system that may require consumable deliver. Therefore, the present invention is applicable to devices including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many other systems.

Figure 1:
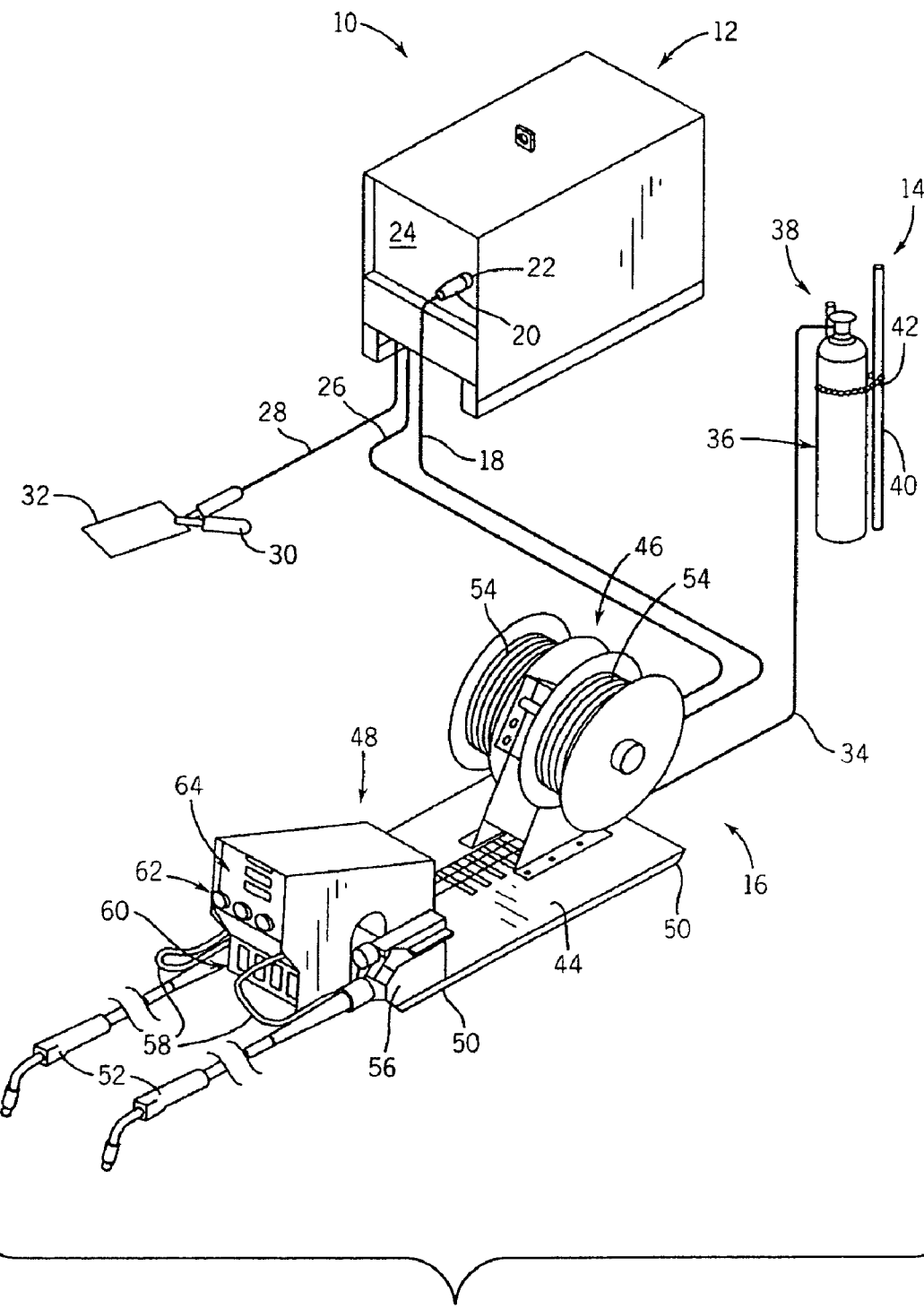
FIG. 1 is a perspective view of an assembled power source and wire feeder combination incorporating the present invention.

Referring now to FIG. 1, a welding system 10 comprises a power source 12, a gas cylinder 14, and a wire feeder assembly 16. The wire feeder 16 is electrically connected to the power source 12 via a control cable 18 wherein the cable 18 includes a pin 20 that engages a corresponding nut 22 on the front panel 24 of the power source 12. Also connected between the power source 12 and the wire feeder 16 is a weld cable 26. The weld cable 26 may be either a positive weld cable or a negative weld cable depending upon the particular welding process. Hereinafter, however, the cable 26 will be described as a positive weld cable. As such, a negative weld cable 28 also extends from the power source 12. The negative weld cable 28 extends from the power source 12 to a clamping member 30, which is configured to hold a workpiece 32. Since the positive weld cable 26 extends to the wire feeder 16 and the negative weld cable 28 extends to the workpiece 32, the requisite voltage potential between the wire feeder 16 and the workpiece 32 necessary for welding is achieved.

Also connected to the wire feeder 16 is a gas hose 34 that supplies gas for an arc-welding process from a gas cylinder 36. The gas cylinder 36 includes a regulator and flow meter 38 and is securely positioned against a structure 40 via a chain 42. One skilled in the art will appreciate that the gas cylinder 36 and regulator and flow meter 38 may also be mounted to the power source 12 or wire feeder 16.

The wire feeder 16 includes a base plate 44 which is configured to support wire feed spindles 46 and a control box 48. It should be noted that on the undersurface of the base plate 44 are a number of rubber feet 50 that help to limit sliding of the wire feeder 16. In the illustrated embodiment, the wire feeder 16 includes two welding torches 52 which are supplied with a welding wire 54 stored on the wire feed spindles 46 by a corresponding drive roller assembly 56. As will be described, the drive roller assembly 56 includes a motor or wire feeder motor. It is contemplated that the drive roller assembly 56 may include a single wire feeder motor or may include a multi-motor configuration. For example, a push-pull wire feeder motor configuration may be utilized whereby a "push" wire feeder motor is disposed within the drive roller assembly 56 and a "pull" wire feeder motor is disposed in the welding torch 52. Each drive assembly 56 is connected to the control box 48 via leads 58. While the illustrated embodiment includes multiple torches 52, as will be described with respect to FIG. 2, the current invention is equally applicable with systems utilizing single torch configurations.

Control box 48 includes a number of controls 60 that are used by the welder or technician to conduct the welding process. The switches include jog/purge push buttons and an ON/OFF switch (not shown). Additional controls 62 include knobs that control the wire speed and a left/right switch 64.

Figure 2:
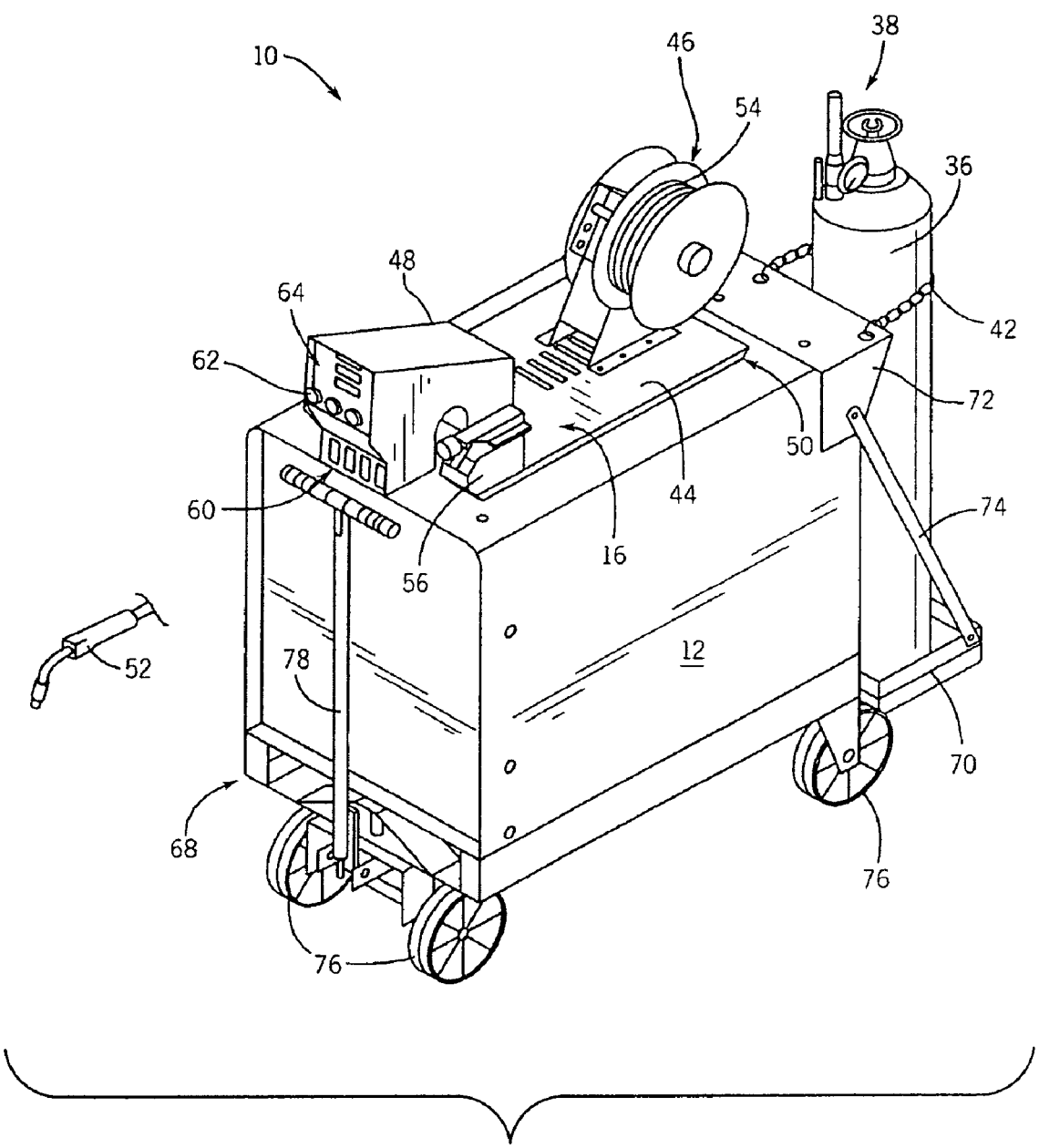
FIG. 2 is a perspective view of an assembled portable embodiment of that shown in FIG. 1.

Referring now to FIG. 2, the aforementioned welding apparatus may also be embodied in a portable system. That is, the wire feeder 16 may be positioned atop the power source 12 and be jointly placed on a pull cart 68. The previously described rubber feet 50 limit sliding movement of the wire feeder 16 when atop the power source 12. The pull cart 68 may also include a cylinder support tray 70 configured to support a gas cylinder 36. In this embodiment, a chain 42 is secured to a plate 72 that is connected to support the tray 70 via a cross-member 74. The plate 72 is designed to be secured to a portion of the power source 12. The pull cart 68 includes wheels 76 and a pulling arm 78 to assist with the transportability of the welding system. Additionally, support tray 70 may be designed to retract under or in the wire feeder pull cart 68 such that the tray may be stored when not in use. Further, one skilled in the art will appreciate that the invention is supplemented with "suitcase" wire feeders and integrated systems where the power source and wire feeder are housed in a common enclosure.

Figure 3:
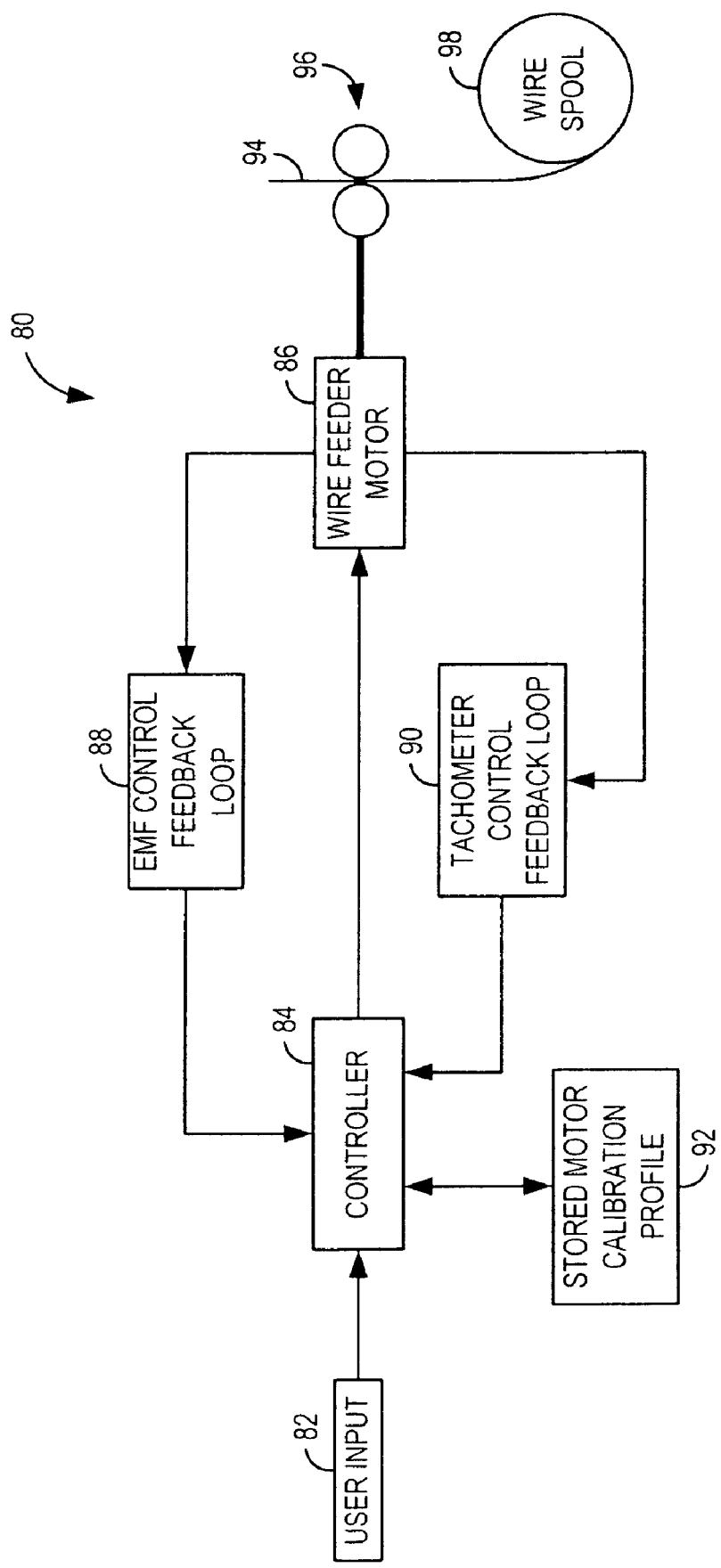
FIG. 3 is a block diagram of a wire feeder system in accordance with one embodiment of the invention.

Referring now to FIG. 3, a block diagram of a wire feeder system 80 is shown. The wire feeder system 80 includes a user input 82 configured to receive commands from an operator and a controller 84 configured to receive the commands from the user input 82. The commands received from the user input 82 are used by the controller 84 to control the operation of a wire feeder motor 86 based on feedback from an EMF control feedback loop 88 or a tachometer control feedback loop 90. Specifically, the control utilizes the feedback from either the EMF control feedback loop 88 or the tachometer control feedback loop 90 to determine from a stored motor calibration profile 92 whether the wire feeder motor 86 is operating to deliver a welding wire 94 at a desired WFS selected through the user input 82. In particular, the stored motor calibration profile 92 allows the controller 84 to determine from the feedback received via one of the feedback loops 88, 90 that wire feeder motor 86 is driving a pair of feed spools 96 at a sufficient speed to pull the wire 94 from a wire spool 98 and achieve the desired WFS input by the operator.

More particularly, the controller 84 uses feedback from the tachometer control feedback loop 90 to determine an average WFS from the stored motor calibration profile 92 and control the operation of the wire feeder motor 86. However, during motor startup, the controller 84 uses feedback from the EMF control feedback loop to monitor instantaneous load changes during a startup period. The EMF control feedback loop is more responsive to the instantaneous variations experienced at motor start-up than the tactrometer control feedback loop. The feedback from the EMF control feedback loop 88 is interpreted using the stored motor calibration profile 92.

To reduce the effects of any characteristics of the wire feeder motor 86 that may deviate from those in the stored motor calibration profile 92, an operator may initiate a calibration mode. As will be described with respect to FIG. 4, when in the calibration mode, the controller 84 is configured to use feedback from the tachometer control feedback loop 90 to adjust the stored motor calibration profile 92. Accordingly, the controller 84 uses feedback from the tachometer control feedback loop 90 to adjust the stored motor control profile 92 while the EMF control feedback loop 88 is used to control the wire feeder motor 86.

Figure 4:
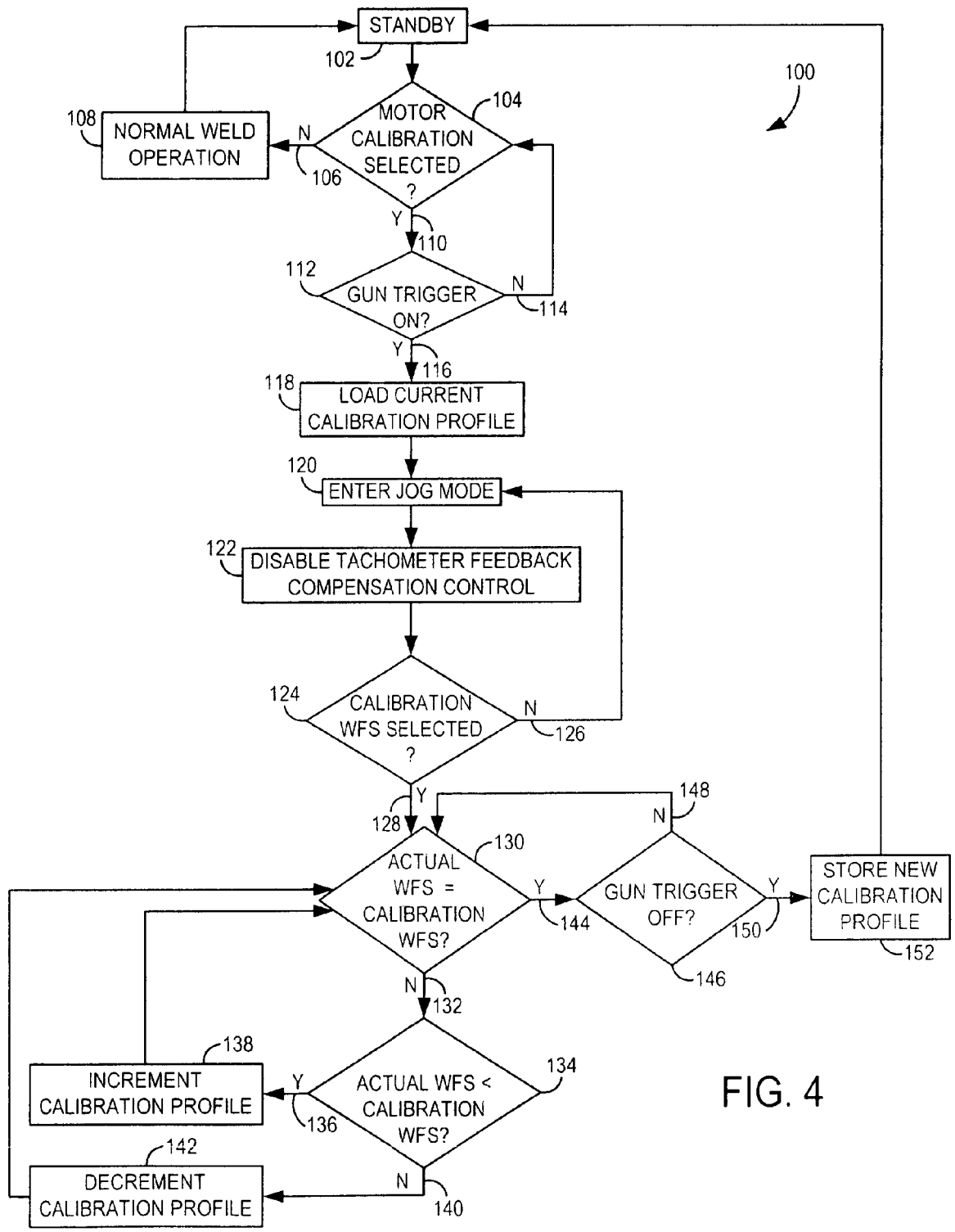
FIG. 4 is a flow chart setting forth the steps of a technique for controlling wire feeders systems shown in FIGS. 1-3 in accordance with one embodiment of the invention.

In particular, referring to FIG. 4, the steps of an automatic motor calibration technique 100 are shown. The technique 100 starts with the wire feeder system in a standby mode 102. The system then determines whether the motor calibration function has been selected 104. If not 106, the wire feeder system is ready to perform a welding operation based on the stored motor calibration profile 108.

However, if the motor calibration function is selected 110, the system determines whether the welding gun trigger has been engaged 112. If not 114, the system continues to check whether the motor calibration function has been selected 104. Once the gun trigger is ON 116, the system loads the current motor calibration profile 118 and enters a "JOG" mode 120. The JOG mode is defined as a precautionary mode whereby the wire feeder system feeds wire without energizing the gun or releasing gas.

Once in JOG mode 120, the system disables control of the wire feeder motor based on the tachometer feedback 122 so that control is based only on the EMF feedback. The system then checks to determine whether the operator has selected the pre-designated calibration WFS 124. In accordance with one embodiment, the calibration WFS is 50 inches per minute (IPM). However, it is contemplated that any WFS may serve as the calibration WFS. That is, the pre-selected calibration WFS may be virtually any WFS that, as will be described, can serve as a predetermined or desired WFS for comparison to the actual WFS.

If the calibration WFS is not selected 126, the operator has not indicated that automatic calibration should begin and the system waits in JOG mode 120. Once the calibration WFS is selected 128, the system compares the calibration WFS to the "actual WFS" as indicated by feedback from the tachometer control feedback loop. That is, the system utilizes the EMF control feedback loop and the stored motor calibration profile to attempt to operate the wire feeder motor at the calibration WFS. To determine whether control of the wire feeder motor based on the EMF control feedback loop and the stored motor calibration profile is accurate, the system checks the actual WFS based on feedback from the tachometer control feedback loop 130.

If the actual WFS deviates from the desired calibration WFS 132, the motor calibration profile is not accurately calibrated for control based on the EMF control feedback loop. As such, the system determines whether the deviation is above or below the calibration WFS 134. If the actual WFS is less than the calibration WFS 136, the system increments the calibration profile 138. This incrementing may not be a simple "addition" to the calibration profile. Rather, the term "increment" is used to denote an adjustment to the calibration profile that should result in an increase in the actual WFS. Furthermore, it is contemplated that this incrementing may be preset or may be dynamically adjusted based on the amount of deviation of the actual WFS from the calibration WFS. By "incrementing" the calibration profile, the actual WFS should approach or match the calibration WFS.

On the other hand, if the actual WFS is greater than the calibration WFS 140, the system decrements the calibration profile 142. Again, this decrementing may not be an simple "subtraction" from the calibration profile. Rather, the term "decrement" is used to denote an adjustment to the calibration profile that should result in a reduction in the actual WFS. Furthermore, it is contemplated that this decrementing may be preset or may be dynamically adjusted based on the amount of deviation of the actual WFS from the calibration WFS. By "decrementing" the calibration profile, the actual WFS should approach or match the calibration WFS.

It is contemplated that incrementing or decrementing the calibration profile may be achieved in a variety of manners. Specifically, an augmentation of the calibration profile may include adjusting current, voltage, and/or power levels supplied to the wire feeder motor in order to achieve a given speed. For example, when feedback indicates that the actual WFS is less than the calibration WFS, the system has identified that the current, voltage, and/or power levels indicated in the current calibration profile to achieve the calibration WFS are inaccurate. Accordingly, an increase in current, voltage, and/or power levels supplied to the wire feeder motor may bring the actual WFS to match the calibration WFS. Therefore, the system "increments" the calibration profile to reflect that the increased in current, voltage, and/or power levels supplied to the wire feeder motor was necessary to achieve a calibration WFS. Similarly, if the actual WFS is greater than the calibration WFS, a "decrementing" of the calibration profile is performed to reflect the decreased current, voltage, and/or power decrease that matched the actual WFS to the calibration WFS.

After incrementing 138 or decrementing 142, the system again checks to determine if the actual WFS matches the calibration WFS 130. If the adjustment to the stored motor control profile 138, 142 was insufficient to substantially match the actual WFS to the calibration WFS 132, the system loops through additional adjustments to the stored motor control profile 134-142.

It is contemplated that a tolerance may be utilized to determine whether the actual WFS matches the calibration WFS 130. That is, if the deviation of the actual WFS from the calibration WFS falls within a defined tolerance, the actual WFS may be accepted as substantially matching the calibration WFS. Once the actual WFS substantially matches the calibration WFS 144, the system determines whether the gun trigger has been released 146. If not 148, the system loops back to check the actual WFS against the calibration WFS 130. Once the trigger is OFF 150, the system stores the adjustments made to the calibration profile to match the actual WFS to the calibration WFS 152. Specifically, the adjusted calibration profile is stored as a new calibration profile that will be used for subsequent control of the wire feeder motor based on the EMF control feedback loop during subsequent starts.

Therefore, when the motor calibration function is selected, the gun trigger pulled, and the system is in JOG mode, control based on the tachometer control feedback loop is disengaged. Therefore, feedback from the EMF control feedback loop is the only regulation loop enabled. In this present state of operation, once the operator adjusts JOG speed to the predetermined calibration speed, the controller operates according to an automatic motor calibration routine. That is, feedback from the tachometer control feedback loop is used to adjust motor calibration factors to match the actual WFS to match the desired or calibration WFS. Once the operator releases the gun trigger, the new motor calibration factors are recorded to memory and used for subsequent startup period control of the wire feeder motor based on feedback from the EMF control feedback loop. The motor calibration routine is disabled by setting the function to OFF in the user input or recycling the power to the wire feeder system.

It is contemplated that this motor calibration technique may be particularly useful upon installation or replacement of a wire feeder motor. Furthermore, the above-described calibration technique is applicable as a test of a wire feeder system that has been recently manufactured or rebuilt by allowing an operator to automatically calibrate the wire feed motor to enhance arc starting performance and consistency. Additionally, it is contemplated that the above-described technique may be utilized with a variety of wire feeder motor configurations. For example, the technique may be utilized to configure a single motor drive wire feeder or a multi-motor wire feeder, such as a push-pull configured wire feeder.

The above-described technique achieves accurate starting and delivery of the consumable wire to effectuate a desired welding-type process. It is contemplated that the calibration technique be utilized to calibrate control to be specific to a unique wire feeder motor. The technique can be advantageously utilized during the initial construction of the wire feeder or after a replacement motor has been installed to achieve improved arc starts.

Additionally, the technique is applicable with a wide variety of welding-type processes. For example, the technique is particularly advantageous with welding-type process that require highly accurate starting and delivery of the consumable wire, such as pulsed welding processes. However, it is contemplated that the present invention is equivalently applicable to a wide variety of welding-type process and welding-type consumable delivery systems and may be utilized with respect to various aspects of welding-type devices.

Therefore, the present invention has been described with particularity to a wire feeder of a welding system. However, the present invention is equivalently applicable to other motor driven machines and systems such as welders, plasma cutters, induction heaters, and the like. Reference to welding power, welding-type power, or welders generally, includes welding, cutting, or heating power.

Therefore, in accordance with one embodiment of the present invention, a wire feeder includes a wire feeder motor configured to drive delivery of a welding wire at an actual wire feed speed (WFS) according to a welding-type process. The wire feeder also includes a processor configured to adjust motor calibration parameters such that actual WFS matches a desired WFS.

In accordance with another embodiment of the present invention, a method of calibrating a wire feeder includes entering a calibration mode for a wire feeder motor, setting a desired WFS, and measuring an actual WFS. The method also includes comparing the actual WFS to the desired WFS and if the actual WFS varies from the desired WFS, modifying a calibration profile until the actual WFS is within a desirable tolerance of the desired WFS. The method further includes storing a modified calibration profile.

In accordance with yet another embodiment of the present invention, a wire feeder calibration system includes a processor. The processor is configured to operate according to a control mode to control a wire feeder motor during startup, a feedback mode to determine an accuracy of wire feeder control after startup, and a calibration mode to adjust a motor control profile to increase control accuracy when in the control mode.

Another embodiment includes a wire feeder that has means for receiving a desired operational speed and means for controlling a wire feeder motor based on a calibration profile of the wire feeder motor. The wire feeder also includes means for determining an actual operational speed of the wire feeder motor, means for comparing the actual operational speed to the desired operational speed, and means for adjusting the calibration profile of the wire feeder motor if the actual operational speed substantially deviates from the desired operational speed to calibrate the means for controlling the wire feeder motor.

In accordance with another embodiment of the present invention, a wire feeder includes a wire feeder motor configured to drive delivery of a welding wire at an actual WFS according to a welding-type process. The wire feeder also includes a processor configured to monitor wire feeder motor operations during a first welding-type process and adjust a motor calibration profile during the first welding-type process such that wire feeder motor operations in a subsequent welding-type process matches a desired wire feeder motor operation profile.

The present invention has been described in terms of the preferred embodiment, and it is recognized that equivalents, alternatives, and modifications, aside from those expressly stated, are possible and within the scope of the appending claims.

What is claimed is:

1. A wire feeder comprising:
 a wire feeder motor configured to drive delivery of a welding wire at an actual wire feed speed according to a stored motor calibration profile and according to a welding-type process; and
 a processor configured to iteratively adjust parameters of the stored motor calibration profile to form a new motor calibration profile such that the actual wire feed speed substantially matches a desired wire feed speed and to store the new motor calibration profile in a memory, wherein the processor is further configured to:
 engage control based on an electromotive force feedback control loop;
 disengage control based on a tachometer feedback control loop;
 receive an indication of the actual wire feed speed from the tachometer feedback control loop;
 compare the actual wire feed speed indicated by the tachometer feedback loop to the desired wire feed speed;
 adjust the parameters to match the actual wire feed speed to the desired wire feed speed; and
 control the wire feeder motor based on the new motor calibration parameters upon a subsequent arc start.

2. The wire feeder of claim 1 wherein the processor is further configured to iteratively increment the parameters if the actual wire feed speed is less than the desired wire feed speed and iteratively decrement the parameters if the actual wire feed speed is greater than the desired wire feed speed.

3. The wire feeder of claim 1 wherein the processor is further configured to operate according to a calibration mode to adjust the motor calibration parameters and operate according to an electromotive force control mode during a startup phase and a tachometer control mode following the startup phase, when not in the calibration mode.

4. The wire feeder of claim 1 wherein the processor is further configured to enable a wire feeder JOG mode before disengaging control based on the tachometer feedback control loop.

5. The wire feeder of claim 1 wherein the processor is further configured to automatically adjust the parameters until the actual wire feed speed substantially matches the desired wire feed speed.

6. The wire feeder of claim 1 wherein the processor is configured to receive feedback from the electromotive force feedback loop to control the actual wire feed speed during a startup period.

7. The wire feeder of claim 1 further comprising the tachometer feedback loop, wherein the tachometer feedback loop is configured to indicate the actual wire feed speed.

8. The wire feeder of claim 1 wherein the wire feeder motor is configured to drive delivery of a welding wire according to a pulsed welding process.

9. A method of calibrating a wire feeder comprising the steps of:
   entering a calibration mode for a wire feeder motor;
   controlling operation of the wire feeder motor based on electromotive force feedback and a stored calibration profile to maintain a desired wire feed speed;
   measuring an actual wire feed speed using tachometer feedback;
   comparing the actual wire feed speed to the desired wire feed speed;
   if the actual wire feed speed varies from the desired wire feed speed, modifying the stored calibration profile based on the tachometer feedback until the actual wire feed speed controlled by the electromotive force feedback is within a desirable tolerance of the desired wire feed speed; and
   storing a modified calibration profile in a memory, wherein the steps of entering, measuring, comparing, modifying, and storing are performed automatically by a wire feeder control.

10. The method of claim 9 further comprising the step of controlling subsequent operation of the wire feeder motor based on the modified calibration profile.

11. The method of claim 9 wherein the step of modifying the calibration profile includes incrementing the calibration profile if the actual wire feed speed is less than the desired wire feed speed and decrementing the calibration profile if the actual wire feed speed is greater than the desired wire feed speed.

12. The method of claim 9 wherein the step of modifying the calibration profile includes adjusting at least one of current, voltage, and power supplied to the wire feeder motor.

13. A wire feeder calibration system having a processor configured to operate according to:
   a control mode to control a wire feeder motor during startup using electromotive force feedback;
   a feedback mode to determine an accuracy of wire feeder control after startup using tachometer feedback; and
   a calibration mode to continuously adjust a motor control profile for the electromotive force feedback based on the tachometer feedback to increase control accuracy when in the control mode.

14. The system of claim 13 wherein the processor is further configured to store adjustments to the motor control profile in a memory as an updated motor control profile and control subsequent wire feeder motor operation based on the updated motor control profile to perform an arc start of a pulsed welding-type process based on the updated motor control profile.

15. The system of claim 13 wherein the processor is further configured to adjust the motor control profile by incrementing the motor control profile if an average operational speed is less than a desired operational speed and decrementing the motor control profile if the average operational speed is greater than to the desired operational speed.

16. A wire feeder comprising:
   a wire feeder motor configured to drive delivery of a welding wire at an actual wire feed speed according to a welding-type process;
   a first feedback control loop configured to control the wire feeder motor during startup and during calibration;
   a second feedback control loop configured to control the wire feeder motor subsequent to startup and to measure the actual wire feed speed during calibration, wherein the second feedback control loop is different from the first feedback control loop, and wherein the first feedback control loop comprises an electromotive force control feedback loop and the second feedback control loop comprises a tachometer control feedback loop; and
   a processor permanently disposed within the wire feeder and configured to:
      monitor wire feeder motor operations during a first welding-type process;
      compare the actual wire feed speed measured by the second feedback control loop during calibration to a desired wire feed speed; and
      adjust a motor calibration profile for the first feedback control loop during the first welding-type process based on the comparison between the actual wire feed speed measured by the second feedback control loop and the desired wire feed speed such that wire feeder motor operations in a subsequent welding-type process matches a desired wire feeder motor operation profile.

17. The wire feeder of claim 16 wherein the processor is further configured to adjust the motor calibration profile with motor operation feedback acquired after expiration of an initialization phase of the first welding-type process such that wire feeder motor operation in the initialization phase of subsequent welding-type processes matches the desired welding-type motor operation profile.

* * * * *